Nov. 18, 1969  C. D. MISERLIS  3,479,254
NITRIC ACID CONCENTRATION
Filed May 22, 1967
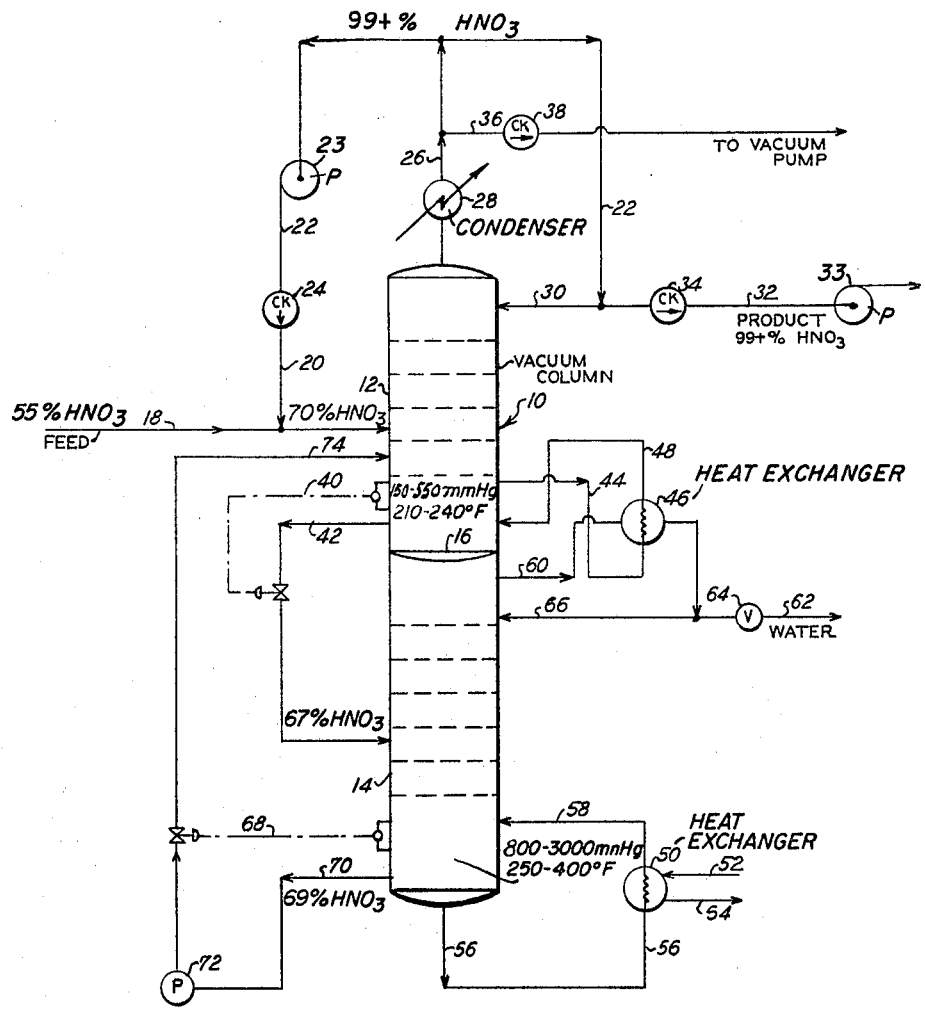
INVENTOR
CONSTANTINE D. MISERLIS
BY
ATTORNEY United States Patent Office 3,479,254
Patented Nov. 18, 1969

3,479,254
NITRIC ACID CONCENTRATION
Constantine D. Miserlis, Arlington, Mass., assignor, by mesne assignments, to The Badger Company, Inc., Cambridge, Mass., a corporation of Delaware
Filed May 22, 1967, Ser. No. 640,254
Int. Cl. C01b 21/44; B01d 3/10, 3/02
U.S. Cl. 203—13                                11 Claims

ABSTRACT OF THE DISCLOSURE

Method and apparatus for concentrating nitric acid by using a first vacuum distillation stage and a second super-atmospheric pressure stage, or columns, with heat interchange therebetween, operating the first stage with a normal dilute acid feed fortified to concentrate it above the azeotropic by recycle of sufficient of its 99% plus concentrated acid overhead, and producing a first stage azeotrope bottoms product, feeding the first stage bottoms product to the second stage super-atmospheric distillation, taking off water as second stage overhead and a more concentrated acid bottoms product for recycle as partial feed to the first stage.

---

This invention relates to a method and apparatus for concentration of nitric acid. More particularly, this invention provides a two-stage distillation system, one under vacuum and the other under super-atmospheric pressure, the combined distillations effecting dehydration of dilute nitric acid with each stage avoiding azeotropic conditions.

According to this invention, the first distillation stage, under reduced pressure, is supplied with a normally dilute nitric acid feed, but which is immediately concentrated above azeotropic before distillation by return of concentrated acid overhead to the entering feed; and the second stage distillation is operated under pressure upon the azeotropic bottoms formed in the first stage, and which produces a concentrated bottoms for recycle to the first stage.

As known in the art, distillation to concentrate dilute nitric acid has not heretofore been possible because of the azeotrope forming at about 66 to 67% nitric acid and the commercial methods have been to add a desiccant, sometimes magnesium nitrate, to absorb water, but most commonly sulfuric acid has been used. Both procedures are uneconomical. The former involves extra handling of the third component magnesium salt desiccant; while the latter involves substantial loss of expensive sulfuric acid as the desiccant while encountering excessive corrosion problems to distill the mineral acid mixture.

According to the present invention, a 99+% highly concentrated nitric acid is produced as distillation overhead from a dilute nitric acid feed by fortifying the feed as it enters a first distillation stage by returning some of the 99% overhead product to the feed, sufficient to increase the normal dilute feed concentration above azeotropic concentration and distilling such more concentrated feed along with some concentrated recycle under reduced pressure conditions to form a 99+% overhead concentrate. A distillation bottoms product of approximately azeotropic concentration is also produced which is redistilled at super-atmospheric pressure with a diluting water reflux, whereby to form water as the overhead, and a more concentrated second stage bottoms available for recycle as concentrated feed to said first stage. The sceond stage distillation at super-atmospheric pressure is maintained at upper plate levels more dilute than azeotropic by return of some of the overhead water as reflux.

In a further aspect of this invention, the high pressure distillation of the second stage may be operated in conjunction with the reduced pressure first stage as a multiple stage evaporator recovering the heat of the overhead water heat of condensation to heat the first stage for highly efficient operation.

In a further aspect of this invention, apparatus comprising a combination of first and second nitric acid distillation columns which preferably are mounted superimposed as a single column for concentration of a dilute nitric acid with a recycle line for return of overhead concentrated acid to the initial feed, to increase its concentration above azeotropic, has a bottoms recycle feed from the second stage outlet forming an auxiliary feed to the first stage; and, finally, heat exchange means from second stage overhead water vapor forms the source of reboiler heat to the bottoms of the first stage.

Thus, according to the present invention, a final overhead concentration of nitric acid up to 99+% is made available in distillation of a dilute feedstream ranging from 55 to 64% nitric acid by first fortifying such feed to exceed the azeotropic concentration; that is, above about 67 to 68%, whereby upon distillation under reduced pressure conditions azeotropic problems are avoided in the first stage. The bottoms product of this first stage per se is about the azeotropic composition. A portion of the bottoms is heated by exchange with water vapors produced in a second stage distillation, thus effecting the first stage concentrated acid evaporation under vacuum by condensation of high pressure vapors produced in the second stage evaporator, whereby total heat economy becomes available in the first acid concentration stage operating under vacuum on the acid side of the azeotrope.

The second stage distillation, in contrast, takes the azeotropic first stage bottoms as feed, distills it under high pressure to evaporate water as its overhead. The high pressure second stage water vapors are condensed in heat exchange with the first stage bottoms to supply the heat needed to operate the first stage. The second stage feed taken as the first stage bottoms is diluted by condenser water returned as reflux, returned to the top of the second stage column; hence the second stage is a distillation of a diluted azeotrope effected at super-atmospheric pressure. The second stage distillation simultaneously produced a more concentrated nitric acid than the azeotrope input feed thereto and is withdrawn and returned to the first stage as a concentrated partial feed thereto. The total heat of the system is supplied by heat from a reboiler disposed at the bottom of the second stage. The total heat input is obtained from moderately high pressure steam, but no very high pressure steam is needed to operate the total system, necessarily being supplied only to the second stage. Such modest heat requirement is in contrast to known distillation purifications, by remote procedures which typically require three and a half times the required heat input used herein.

The invention is further described with reference to the drawing wherein the single figure illustrates a single distillation column 10, preferably divided into an upper first stage column portion 12 and a lower second stage column portion 14 separated by a partitioning plate 16. Dilute nitric acid feed enters to an intermediate plate level of the upper column 12 through line 18, and is fortefied to increase its concentration above azeotropic as it enters the column 12 by a concentrated feedstream of 99+% nitric acid recycled through line 20 from overhead concentrated acid concentrate at line 22 protected from higher pressure in line 18 through check valve 24, the concentrated fortifying stream of acid in line 20 being impelled by a pump 23.

The intermediate concentrated acid feed stream entering the column 12 through line 18 as well as some recycle acid in line 74 is heated by ascending nitric acid vapors passing upward through the column at increasing concentration, forming a 99+% vapor overhead in line 26 which is cooled to liquid by a condenser 28, a portion in line 22, as stated, being returned to fortify the feed entering in line 18, a portion in line 30 being returned to the top of the column 12 as reflux, and a portion, as 99+% nitric acid end product, being withdrawn from the system through line 32 to storage, line 32 being protected by a check valve 34. A pump 33 may be placed in line 32 for movement of fluid therein.

The lines 22 and 26 and distillation column 12, in liquid vapor circuit therewith, may have the pressure reduced as desired below atmospheric, being connected through line 36 to a vacuum pump (not shown). A check valve 38 may be mounted in that line 36.

The stripped liquid descending through column 12 accumulates on the bottom partitioning plate 16 to a level controlled by a float through line 40. The accumulating bottoms liquid is ultimately withdrawn through line 42 and passed as feed to an intermediate point of the second stage high pressure column 14. A portion of the accumulated bottoms liquid in column 12 is also continuously withdrawn through line 44 and passed through heat exchanger 46 for reheat and returned through line 48 to the bottom of the column 12 as reboiler liquid, whereby the accumulating liquid at the bottom of the column is stripped of acid to about the azeotropic concentration, while supplying heat for the first stage column 12.

The liquid entering column 14 through line 42 is heated by reboiler heat exchanger 50 maintained at superatmospheric pressure and heated by high pressure steam entering the heat exchanger through line 52 and leaving by way of line 54. To heat the second stage column the bottoms liquid is withdrawn through reheater line 56 and returned to the bottom of the column through line 58 as hot concentrated acid. Water vapor is evaporated in the column and passing upward as water vapor overhead through overhead vapor line 60, being condensed in exchanger 46 to water and withdrawn through line 62 from the system. A valve 64 is mounted in line 62 to control the pressure in column 14.

A portion of the condensed water is returned through line 66 to the top of the column as a diluting reflux. In this manner, with continuous dilution of the acid at the top of the column by reflux, the second stage is a distillation of acid more dilute than azeotropic, and is effected at high pressure. The concentrated acid from which water has thus been distilled accumulates in the bottom of the column 14. The accumulated acid in the bottom of the high pressure column 14 has been increased in concentration to the acid side; that is, greater than an azeotropic concentration, and preferably is sent to the column 12 at a point corresponding to the concentration of the fluid at the selected plate level. While the vacuum column 12 is operated on the vacuum side, it is preferred to maintain the pressure therein at a bottoms pressure in the range of from about 150 to 550 mm. Hg abs., preferably about 300 to 450 mm. Hg, and a temperature in the range of 210 to 240° F., preferably about 215 to 230° F. The high pressure second stage may have a bottoms pressure ranging from about 800 to 3,000 mm. Hg, and preferably about 1200 to 1800 mm. Hg, and a temperature from about 250 to 400° F., preferably about 275 to 325° F., produced by high pressure steam passed through the heat exchanger 50.

The concentrated bottoms are withdrawn by pump 72 and from line 70 returned as a recycle feedstream to the first stage column 12 by way of line 74, the bottoms level in column 14 being controlled by a float in line 68.

The following example illustrates the practice of this invention:

Example I

55% dilute nitric acid entering line 18 as feed is blended with 99.6% concentrated nitric acid from line 20 in proportion to form 70% nitric acid as it enters a midsection of the column still 12 maintained under a bottoms pressure of 400 mm. Hg abs. and a bottoms temperature of 220° F. The nitric acid vapors are liquified in condenser 28 and analyze 99.6%. A portion of the 99.6% $HNO_3$ is returned as reflux through line 30 to the top of the column. A second portion passes through lines 22 and 20 and is returned to the feed in quantity to enhance its concentration to 70% and a residual quantity of 99.6% end product is withdrawn from the system through line 32. The nitric acid bottoms product above partitioned plate 16 has an azeotropic concentration of approximately 67%. A portion of the bottoms is withdrawn through line 44, reheated in heat exchanger 46 and returned through line 48 to the bottom of the column to maintain the acid bottoms temperature of 220° F. The accumulated bottoms product from the plate 16 at a rate controlled by a float level in line 40 is withdrawn from line 42 and sent to about the center plate of a second stage high pressure column 14. Accumulated bottoms liquid of column 14 is heated in exchanger 50 with steam at 100 p.s.i.g. to maintain a pressure at the bottom of the column of 1200 mm. Hg and a temperature of 275° F. Water vapor is taken off through line 60 and is cooled in exchanger 46 to a temperature of 220° F. and condensed under pressure at that temperature. A portion of the water is withdrawn through line 62 and is discarded from the system and another portion is returned through line 66 as reflux. The azeotropic composition entering the high pressure still 14 through line 42 is concentrated as bottoms to 69% nitric acid and is withdrawn through line 70 and returned by pump 72 and line 74 to the first stage distillation column 12 for further recovery of nitric acid therein. It will be noted that all of the heat made available to the first stage column 12 is supplied through heat exchanger 46.

Various modifications will occur to those skilled in the art and, accordingly, it is intended that the example and illustration of the system be regarded as exemplary and not limiting except as defined in the claims.

I claim:

1. A process of concentrating dilute nitric acid solution comprising first concentrating said dilute solution by mixing the same with sufficient and only with highly-concentrated distilled nitric acid to form a nitric acid feed mixture in which the weight percent of $NHO_3$ in the feed mixture is more concentrated than an aqueous nitric acid azeotrope, introducing the feed mixture into a distillation column and distilling said nitric acid feed mixture to produce a highly concentrated nitric acid overhead and recycling a portion of said highly concentrated nitric acid overhead to said dilute nitric acid solution sufficient to increase its concentration to said feed mixture.

2. The method as defined in claim 1 wherein the distillation is effected at pressures substantially reduced below atmospheric.

3. The method as defined in claim 2 wherein the bottoms product formed in said nitric acid distillation is at substantially azeotropic concentration, said bottoms product being separately redistilled at super-atmospheric pressure to produce an overhead product of water, and a bottoms product of nitric acid more concentrated than azeotropic and recycling said bottoms product to said first distillation as a portion of the concentrated nitric acid feed thereto.

4. The method as defined in claim 3 wherein said redistillation is performed in a multi-tray column and the overhead water vapor product of said redistillation is condensed and a portion thereof is returned to the upper trays of said column as reflux substantially to reduce the feed to said column to a concentration less than azeotropic.

5. The method as defined in claim 3 wherein the overhead water vapor produced in said redistillation is condensed in heat exchange with the azeotropic bottoms of said first stage distillation to supply the vaporizing heat to said first distillation.

6. The method of concentrating dilute nitric acid comprising distilling said nitric acid in two stages, a first stage maintained at substantially reduced pressure with the dilute nitric acid feed passing thereto being first fortified to substantially exceed azeotropic concentration only by recycling and mixing with said dilute feed a portion of the concentrated nitric acid overhead as produced in said first stage distillation to form a feed mixture in which the weight percent of $HNO_3$ exceeds said azeotropic concentration and introducing said feed mixture to said first stage, said first stage further producing nitric acid at approximate azeotropic concentration as its distillation bottoms product, and a second stage distillation effected at super-atmospheric pressure upon the azeotropic bottoms of said first stage as a feed thereto, said second stage distillation producing substantially water vapor as overhead product and a more concentrated nitric acid as its bottoms product.

7. The method as defined in claim 6 wherein the overhead water vapor of said second stage is condensed, and a portion thereof is returned as reflux for the azeotropic feed entering near the top of said second stage column for dilution thereof.

8. The method as defined in claim 6 wherein the overhead water vapors evolved from said second stage distillation are condensed in heat exchange with the bottoms liquid of said first stage distillation to provide distillation heat for said first stage.

9. The method of defined in claim 6 wherein the bottoms product of said second stage distillation, substantially more concentrated than azeotropic, is recycled as a portion of the concentrated feed to said first stage.

10. The method of concentrating dilute nitric acid comprising distilling said dilute nitric acid in two stages, a first stage maintained at substantially reduced pressure with the dilute nitric acid feed passing thereto being fortified to exceed azeotropic concentration only by recycling a portion of the highly concentrated nitric acid overhead produced in said first stage to mix with said dilute feed and form a feed mixture in which the weight percent of $HNO_3$ exceeds said azeotropic concentration and introducing said feed mixture into said first stage and withdrawing the remaining portion of concentrated nitric acid from the system, said first stage simultaneously producing nitric acid at approximate azeotropic concentration as a bottoms product, and a second stage distillation effected at super-atmospheric pressure upon the azeotropic bottoms of said first stage passing as a feed from the first stage to said second stage, said second stage producing substantially water vapor as overhead and a more concentrated nitric acid as a bottoms product therein, condensing said overhead water vapor in heat exchange with azeotropic bottoms of said first stage to provide heat for maintaining said first stage distillation while condensing said water vapor, and recycling a portion of the condensed water vapor as reflux to said second stage column diluting the azeotropic feed thereto, and withdrawing the concentrated acid bottoms of said second stage and recycling the same as a portion of the feed to said first stage.

11. Apparatus for concentrating dilute nitric acid by evaportion comprising in combination a first stage distillation column and a second stage distillation column, means for passing a dilute nitric acid feed to an intermediate height of said first column, means for condensing overhead highly concentrated nitric acid vapors produced in said column, means for returning a portion of said concentrated acid condensate to the entering dilute acid feed to said first column and for withdrawing the remaining portion of the concentrated acid feed from the system, means for withdrawing accumulated dilute acid from the lower end of first column and passing the same to an intermediate point of said second column, a heat exchanger, means for passing, as independent streams, bottoms liquid from said first column with means for return of the heated bottoms liquid for reheat of fluids in said first column and overhead vapors from the second column, both streams in heat exchange through said heat exchanger, means for returning a portion of the condensed water from said exchanger to an upper portion of said second stage column as reflux and dilution water, means for withdrawing a second portion of the condensed water from said system, means for recycling concentrated acid from the bottom of said second stage column to an intermediate point of said first stage column, and means for supplying heat to the bottom of said second stage column for heating the system.

References Cited

UNITED STATES PATENTS

| | | | |
|---|---|---|---|
| 1,772,123 | 8/1930 | Zeisberg | 203—13 |
| 3,106,515 | 10/1963 | Williams | 203—13 |

FOREIGN PATENTS 82,135   11/1963   France.

NORMAN YUDKOFF, Primary Examiner

J. SOFER, Assistant Examiner

U.S. Cl. X.R.

23—160; 203—78